(12) United States Patent
Bao et al.

(10) Patent No.: US 10,235,632 B2
(45) Date of Patent: Mar. 19, 2019

(54) AUTOMATIC CLAIM RELIABILITY SCORER BASED ON EXTRACTION AND EVIDENCE ANALYSIS

(71) Applicant: INTERNATIONAL BUSINESS MACHINES CORPORATION, Armonk, NY (US)

(72) Inventors: Sheng Hua Bao, San Jose, CA (US); Rashmi Gangadharaiah, San Jose, CA (US); Richard L. Martin, Jamaica Plain, MA (US); David Martinez Iraola, Sunnyvale, CA (US); Meenakshi Nagarajan, San Jose, CA (US); Dan G. Tecuci, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/892,752

(22) Filed: Feb. 9, 2018

(65) Prior Publication Data

US 2018/0330263 A1    Nov. 15, 2018

Related U.S. Application Data

(63) Continuation of application No. 15/591,555, filed on May 10, 2017.

(51) Int. Cl.
*G06N 5/02* (2006.01)
*G06N 7/00* (2006.01)
*G06N 99/00* (2019.01)

(52) U.S. Cl.
CPC ............... *G06N 7/005* (2013.01); *G06N 5/02* (2013.01); *G06N 99/005* (2013.01)

(58) Field of Classification Search
CPC ............ G06N 99/00; G06N 7/00; G06N 5/02
See application file for complete search history.

(56) References Cited

U.S. PATENT DOCUMENTS

| 8,819,047 | B2 | 8/2014 | Cucerzan et al. |
| 8,990,234 | B1 | 3/2015 | Myslinski |
| 2004/0098250 | A1 | 5/2004 | Kimchi et al. |
| 2004/0122846 | A1 | 6/2004 | Chess et al. |

(Continued)

OTHER PUBLICATIONS

Aharoni, Ehud, et al. "A benchmark dataset for automatic detection of claims and evidence in the context of controversial topics." Proceedings of the First Workshop on Argumentation Mining. 2014.*

(Continued)

*Primary Examiner* — Eric Nilsson
(74) *Attorney, Agent, or Firm* — Nicole A. Spence

(57) ABSTRACT

A method, computer system, and a computer program product for determining the reliability of a claim is provided. The present invention may include receiving an input data from a user. The present invention may also include analyzing the claim associated with the received input data to determine a reliability score associated with the input data, wherein the claim is semantically similar to the received input data. The present invention may further include generating, from a prediction model, the reliability score for the claim associated with the received input data. The present invention may also include presenting the reliability score for the claim associated with the received input data to the user.

1 Claim, 7 Drawing Sheets

(56) References Cited

U.S. PATENT DOCUMENTS

| | | | |
|---|---|---|---|
| 2011/0208723 A1 | 8/2011 | Nicks et al. | |
| 2011/0307435 A1* | 12/2011 | Overell | G06F 17/278 706/46 |
| 2013/0268519 A1* | 10/2013 | Cucerzan | G06F 17/30864 707/723 |
| 2014/0040249 A1 | 2/2014 | Ploesser et al. | |
| 2016/0350410 A1 | 12/2016 | Aharoni et al. | |

OTHER PUBLICATIONS

Agichtein et al., "Snowball: Extracting Relations from Large Plain-Text Collections," Proceedings of the Fifth ACM International Conference on Digital Libraries (ACM DL), 2000, 10 Pages.

Aharoni et al., "Claims on Demand—An Initial Demonstration of a System for Automatic Detection and Polarity Identification of Context Dependent Claims in Massive Corpora," Proceedings of COLING 2014 the 25th International Conference on Computational Linguistics: System Demonstrations, Aug. 23-29, 2014, p. 6-9, Dublin, Ireland.

Banko et al., "Open Information Extraction from the Web," IJCAI-07: Proceedings of the 20th International Joint Conference on Artificial Intelligence, 2007, p. 2670-2676.

Berant et al., "Semantic Parsing via Paraphrasing," Proceedings of the 52nd Annual Meeting of the Association for Computational Linguistics, Jun. 23-25, 2014, p. 1415-1425, Association for Computational Linguistics, Baltimore, Maryland, USA.

Bilu et al., "Automatic Claim Negation: Why, How and When," Proceedings of the 2nd Workshop on Argumentation Mining, Jun. 4, 2015, p. 84-93, Association for Computational Linguistics, Denver, Colorado.

Blanco et al., "A Logic Prover Approach to Predicting Textual Similarity," Proceedings of the Twenty-Sixth International Florida Artificial Intelligence Research Society Conference, 2013, p. 255-258, Association for the Advancement of Artificial Intelligence.

Buscaldi et al., "LIPN-CORE: Semantic Text Similarity using n-grams, WordNet, Syntactic Analysis, ESA and Information Retrieval based Features," Second Joint Conference on Lexical and Computational Semantics (*SEM), vol. 1: Proceedings of the Main Conference and the Shared Task, Jun. 13-14, 2013, p. 162-168, Association for Computational Linguistics, Atlanta, Georgia.

Chapman et al., "Extending the NegEx Lexicon for Multiple Languages," Studies in Health Technology and Informatics, 2013, p. 677-681, vol. 192.

Councill et al, "What's Great and What's Not: Learning to Classify the Scope of Negation for Improved Sentiment Analysis," Proceedings of the Workshop on Negation and Speculation in Natural Language Processing, Jul. 2010, p. 51-59, Uppsala.

Etzioni et al., "Unsupervised Named-Entity Extraction from the Web: An Experimental Study," Artificial Intelligence, 2005, p. 91-134, vol. 165, Elsevier B.V.

Ganitkevitch et al., "PPDB: The Paraphrase Database," Proceedings of NAACL-HLT 2013, Jun. 9-14, 2013, p. 758-764, Association for Computational Linguistics, Atlanta, Georgia.

Grishman et al., "Message Understanding Conference-6: A Brief History," Proceedings of the 16th Conference on Computational Linguistics, 1996, p. 466-471.

Indiana University, "Indiana University Scientists Create Computational Algorithm for Fact-Checking," IU Bloomington Newsroom, Jun. 17, 2015, p. 1-4, http://archive.news.indiana.edu/releases/iu/2015/06/computational-fact-checker.shtml, Accessed on Apr. 6, 2017.

Kambhatla, "Combining Lexical, Syntactic, and Semantic Features with Maximum Entropy Models for Extracting Relations," Proceedings of the ACL 2004 on Interactive Poster and Demonstration Sessions (ACLdemo '04), Jul. 21-26, 2004, 4 Pages, Barcelona, Spain.

Lotan et al., "TruthTeller: Annotating Predicate Truth," Proceedings of NAACL-HLT 2013, Jun. 9-14, 2013, p. 752-757, Association for Computational Linguistics, Atlanta, Georgia.

Mell et al., "The NIST Definition of Cloud Computing," National Institute of Standards and Technology, Sep. 2011, p. 1-3, Special Publication 800-145.

Mikolov et al., "Efficient Estimation of Word Representations in Vector Space," arXiv CS: Computation and Language, 2013, p. 1-12, arXiv:1301.3781 [cs.CL], Cornell University Library.

Mutalik et al., "Use of General-purpose Negation Detection to Augment Concept Indexing of Medical Documents: A Quantitative Study Using the UMLS," Journal of the American Medical Informatics Association, Nov./Dec. 2001, p. 598-609, vol. 8, No. 6.

Rinott et al., "Show Me Your Evidence—an Automatic Method for Context Dependent Evidence Detection," Proceedings of the 2015 Conference on Empirical Methods in Natural Language Processing, Sep. 17-21, 2015, p. 440-450, Association for Computational Linguistics, Lisbon, Portugal.

Rus et al., "On Paraphrase Identification Corpora," Proceeding on the International Conference on Language Resources and Evaluation (LREC 2014), 2014, p. 2422-2429.

Schölkopf et al., "Shrinking the Tube: A New Support Vector Regression Algorithm," Advances in Neural Information Processing Systems, 1999, p. 330-336.

Tatu et al., "COGEX at RTE3," Proceedings of the Workshop on Textual Entailment and Paraphrasing, Jun. 2007, p. 22-27, Association for Computational Linguistics, Prague.

Vaishnavi et al., "Paraphrase Identification in Short Texts using Grammar Patterns," 2013 International Conference on Recent Trends in Information Technology (ICRTIT), p. 472-477, IEEE.

Yarowsky, "Unsupervised Word Sense Disambiguation Rivaling Supervised Methods," Proceedings of the 33rd Conference on Association for Computational Linguistics, 1995, p. 189-196.

IBM, "List of IBM Patents or Patent Applications Treated as Related (Appendix P)," Apr. 13, 2018, p. 1-2.

Bao et al., "Automatic Claim Reliability Scorer Based on Extraction and Evidence Analysis," Application and Drawings, filed May 10, 2017, 45 Pages, U.S. Appl. No. 15/591,555.

* cited by examiner

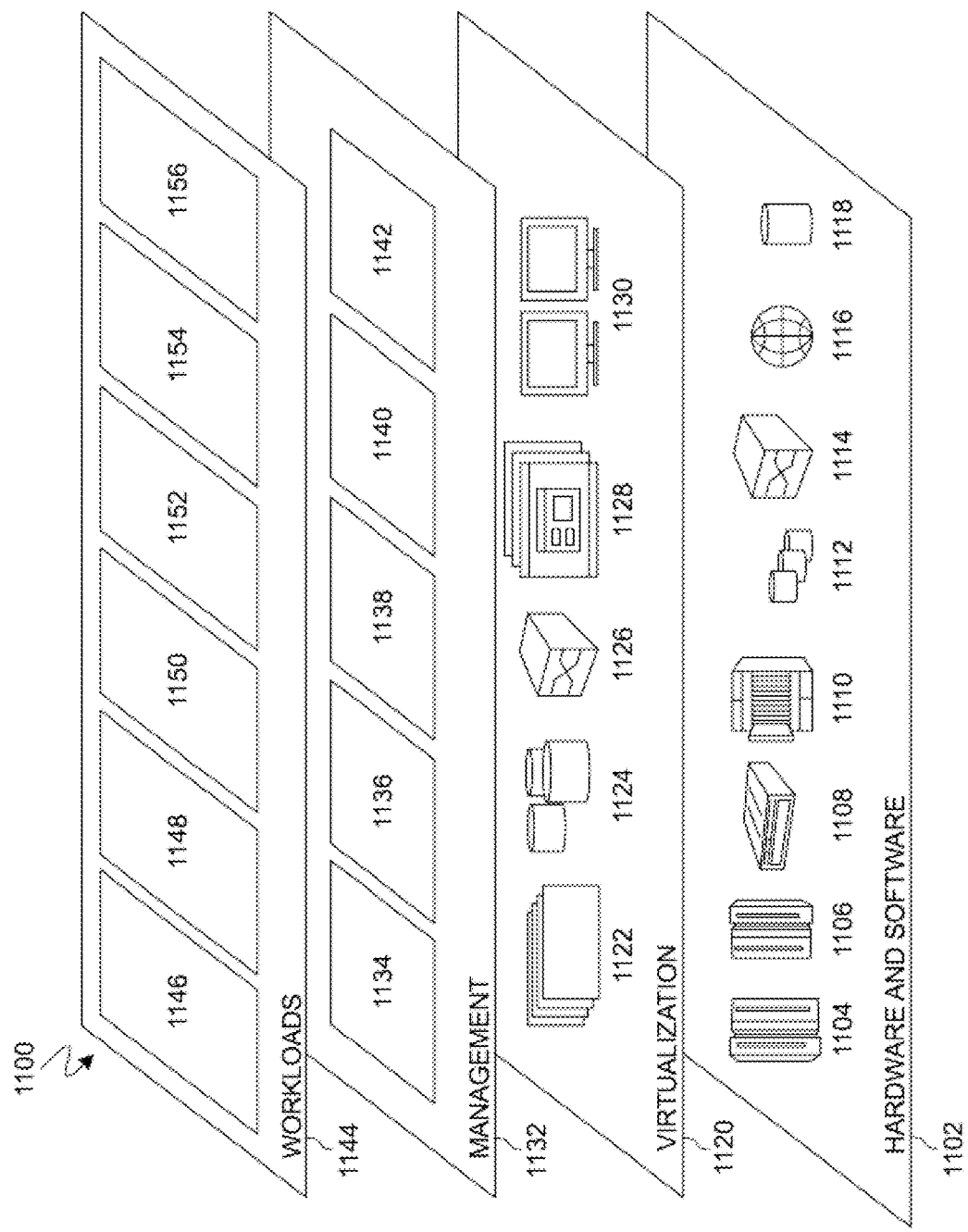

AUTOMATIC CLAIM RELIABILITY SCORER BASED ON EXTRACTION AND EVIDENCE ANALYSIS

BACKGROUND

The present invention relates generally to the field of computing, and more particularly to computational linguistics.

Claims, which are statements concerning the relationship between at least two entities, are constantly distributed through different sources, such as social networks, mass media and scientific publications. In some instances, these claims are supported by evidence, and, in other instances, the claims are unsubstantiated and based on mere speculation, conjecture, opinion or belief. However, without additional information, determining whether to rely on a claim is a difficult task for any person. If a person could determine the reliability and history of a claim, then the person may be better able to interpret and utilize the claim.

SUMMARY

Embodiments of the present invention disclose a method, computer system, and a computer program product for determining the reliability of a claim. The present invention may include receiving an input data from a user. The present invention may also include analyzing the claim associated with the received input data to determine a reliability score associated with the input data, wherein the claim is semantically similar to the received input data. The present invention may further include generating, from a prediction model, the reliability score for the claim associated with the received input data. The present invention may also include presenting the reliability score for the claim associated with the received input data to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 7 is a block diagram of functional layers of the illustrative cloud computing environment of FIG. 6, in accordance with an embodiment of the present disclosure.

DETAILED DESCRIPTION

Figure 1:
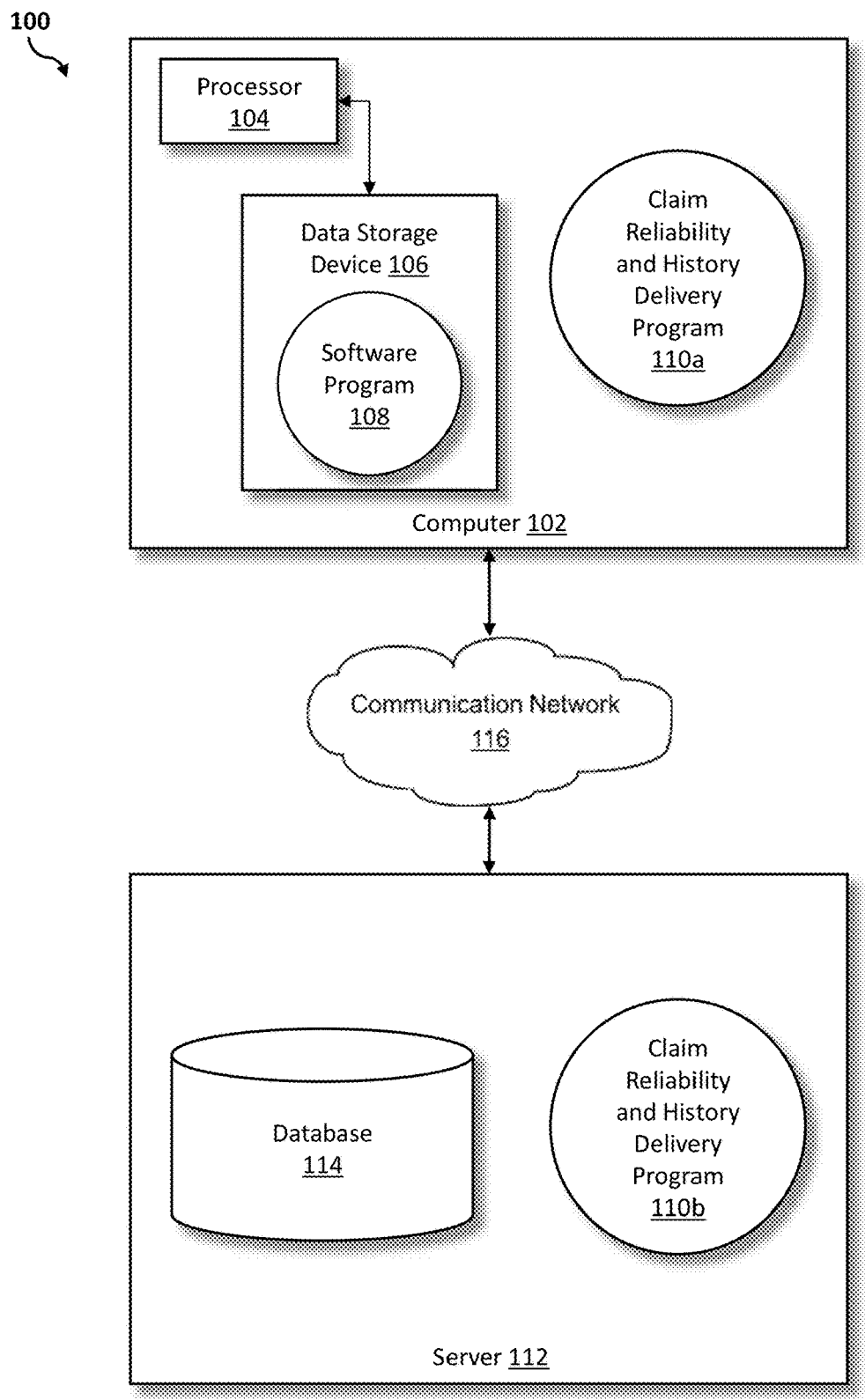
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for determining the reliability and history of a claim. As such, the present embodiment has the capacity to improve the technical field of computational linguistics by extracting the claim from a collection of literature, computing the reliability of the claim, and tracking the history of the claim. The present embodiment is thereby able to present the information to a user to interpret and utilize the claim, as well as to further investigate the knowledge supporting the claim. More specifically, a claim may be entered to the claim reliability and history delivery program, which runs the prediction model to retrieve a reliability score for the entered claim. To generate the history of the entered claim, the claim reliability and history delivery program may search the knowledge base to retrieve the history of the entered claim. The user may filter the claim history based on the attributes (i.e., polarity, type of literature, source of funding, assertiveness, strength of the evidence supporting the claim and certainty) associated with the entered claim. The claim reliability and history delivery program may also present a visualization of the filtered claim history that provides the user with different views to navigate the history of the claim, and a clickable claim history chart in which the user may click on various points of the literature that mention the claim, or find a citation in which the claim is mentioned.

As described previously, claims, which are statements concerning the relationship between at least two entities, are constantly distributed through different sources, such as social networks, mass media and scientific publications. In some instances, these claims are supported by evidence, and, in other instances, the claims are unsubstantiated and based on mere speculation, conjecture, opinion or belief. However, without additional information, determining whether to rely on a claim is a difficult task for any person. If a person could determine the reliability and history of a claim, then the person may be better able to interpret and utilize the claim.

Therefore, it may be advantageous to, among other things, obtain a reliability score for each claim based on evidence and metadata, if available, extracted for each mention of the claim in literature, and to track the history of each claim.

According to at least one embodiment, the claim reliability and history delivery program may utilize relationship extraction to extract claims expressed in natural language from a collection of literature. A claim may be defined as the relationship between two or more entities, and relationship extraction may extract the semantic relations between the involved entities that are included in a claim from unstructured text. The claim reliability and history delivery program may retrieve the type of literature (e.g., industry-linked vs. independent research, prestige of journal, conference, personal communication, or link to previous claims) in which the claim occurred. Then, the claim reliability and history delivery program may retrieve the strength of the supporting evidence (e.g., meta-analysis, empirical study, user study, systematic analysis of the literature, cohort study, case-control study, cross-sectional study, case report, opinion, reference, or no evidence) from the collection of literature including the claim. Then, the claim reliability and history delivery program may retrieve the source of funding (e.g., government, military, industry, and independent) from the collection of literature including the claim, or from metadata (i.e., digital images, digital audio files, or websites), if available.

According to at least one embodiment, the extraction of claims may include parsing through each sentence within the selected literature to identify claims. Each of the claims may be further analyzed by negation and speculation classifiers to identify the polarity and assertiveness of the claim. The other semantic parsers (i.e., evidence and source types) may run separately and natural language processing may be relied on to identify the type of evidence found in the literature and the source. According to at least one embodiment, the evidence type and source may be obtained from metadata.

According to at least one embodiment, the claim reliability and history delivery program may utilize paraphrase detection to group together claims that are semantically-equivalent paraphrases of each other, including claims with different polarity (e.g., positive or negative), assertiveness (e.g., assertive or speculative), or surface language. Therefore, the claim reliability and history delivery program may be able to detect the polarity of the claim, and associate claims that are stated in different but related terms. Then, the claim reliability and history delivery program may compute the accumulated reliability of the claim by relying on a supervised machine learning regression model (i.e., prediction model), which may be trained offline over a sample of claims manually annotated by hand with binary labels (i.e., reliable=1, unreliable=0). Then, the claim reliability and history delivery program may extract attributes for each instance of the claim including the instances in which the claim was supported by various types of evidence (i.e., no evidence, referential evidence, or opinion-based evidence). The claim reliability and history delivery program may also extract other attributes, such as a timestamp and the source of the funding for each instance of the claim. After training is completed on the prediction model, an extracted sample claim may obtain a reliability score based on the attributes of the claim. If there is a lack of evidence in the literature, the positive instances for the claim are old, and the strength of the evidence is low, then the sample claim may obtain a score close to zero.

According to at least one embodiment, the claim reliability and history delivery program may utilize several additional enabling technologies including polarity detection, use feature-based and kernel-based supervised techniques, and semi-supervised and bootstrapping techniques to extract and classify claims and associated attributes obtained from unstructured text within a collection of literature. Polarity detection (i.e., negation detection) may be utilized to identify negated clauses and sub clauses within the extracted claims. Use feature-based and kernel-based supervised techniques may be utilized to perform relation extraction between the claims. Semi-supervised and bootstrapping techniques may use a small set of tagged seed instances or a few hand-crafted rules to extract the claims, in addition to the entities within the claims.

According to at least one embodiment, the claim reliability and history delivery program may include a tool to navigate all instances of semantically-equivalent claims in a collection of literature in which the user may assess the evidence from each instance based on different attributes (e.g., polarity, certainty expressed in the claim, type of study, strength of evidence, source of funding). In addition, the claim reliability and history delivery program may be able to link the associated attributes to the claim.

The present embodiment may include searching for claims based on the involved entities, and then ranking the claims based on reliability. The user may enter at least one entity as input into the claim reliability and history delivery program. Then, the claim reliability and history delivery program may search the knowledge base for the history of the claims involving the entity entered by the user. The claim reliability and history delivery program may also extract all the instances of claims involving the entity entered by the user, and the attributes associated with each claim. Then, the claim reliability and history delivery program may retrieve the reliability score for each of the claims from the prediction model, and provide a list of claims involving the given entity. The list of claims may be customized for the user to rank the list of claims based on reliability of the claim or the amount of studies in which the claim is mentioned.

According to at least one embodiment, the claim reliability and history delivery program may possess a visualization feature (i.e., filtered claim history visualization) to navigate the history of the claim based on the different contextual features (i.e., attributes) associated with the claim. Since not all claims have the same reliability, the visualization feature may present this information to the user to enable easy access to claim history, to enhance accurate investigation on the background knowledge associated with the claim, to determine the reliability of the claim, and to solve citation bias (i.e., cases where unreliable claims are repeatedly cited without verification of the sources).

According at least one embodiment, the claim reliability and history delivery program may present the history of each claim and the associated attributes in a scatter plot or line charts. Therefore, a user may have another visualization representation of the given claim and the associated attributes to determine the reliability and history of the given claim.

The present embodiment may include searching for claims by certainty. The claim reliability and history delivery program may permit the ranking of claims involved in the particular instance based on assertiveness, or the type of source in which the claim appears in. The higher the ratio of speculative mentions and the less credible the source of the claim, the less reliable the claim and more research and investigation is needed on the claim.

The present embodiment may include indexing claims. The claims may be indexed based on the attributes or the involved entities, which may have been obtained when the claim reliability and history delivery program parsed through the literature. Claim indexing may lead to easy accessibility of information and retrieval of the full claim.

The present embodiment may include a supervised machine learning module (i.e., regression learner) to create the prediction model, which may predict the reliability score of a given claim. The supervised machine learning module may rely on support vector regression to learn a module from sample labeled data (i.e., training data), whereby each claim may possess a binary reliability label. The support vector regression may provide a function that minimizes the prediction error and maximizes flatness (i.e., sensitivity to perturbations), and may fit all the training instances within a margin of width. A user-specified parameter may be enabled to possibly define a lower limit from where deviations may be considered.

According to at least one embodiment, the knowledge base may include all mentions of the claim, regardless of whether the mention is positive or negative, with semantic features about the reliability of each instance of the claim. According to at least one embodiment, the prediction model may generate the reliability score for each of the claims based on the associated attributes for each of the claims. The claim reliability and history delivery program may present these mentions of the claim individually, as well as aggregated, for a better understanding of the history and reliability of the claim according to the associated attributes. Therefore, the user may be provided with a deep analysis of the claim, and not only information retrieval and keyword processing.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a claim reliability and history delivery program 110a. The networked computer environment 100 may also include a server 112 that is enabled to run a claim reliability and history delivery program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the claim reliability and history delivery program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the claim reliability and history delivery program 110a, 110b (respectively) to determine the reliability and history of extracted claims from a collection of literature. The claim reliability and history delivery method is explained in more detail below with respect to FIGS. 2-4.

Figure 2:
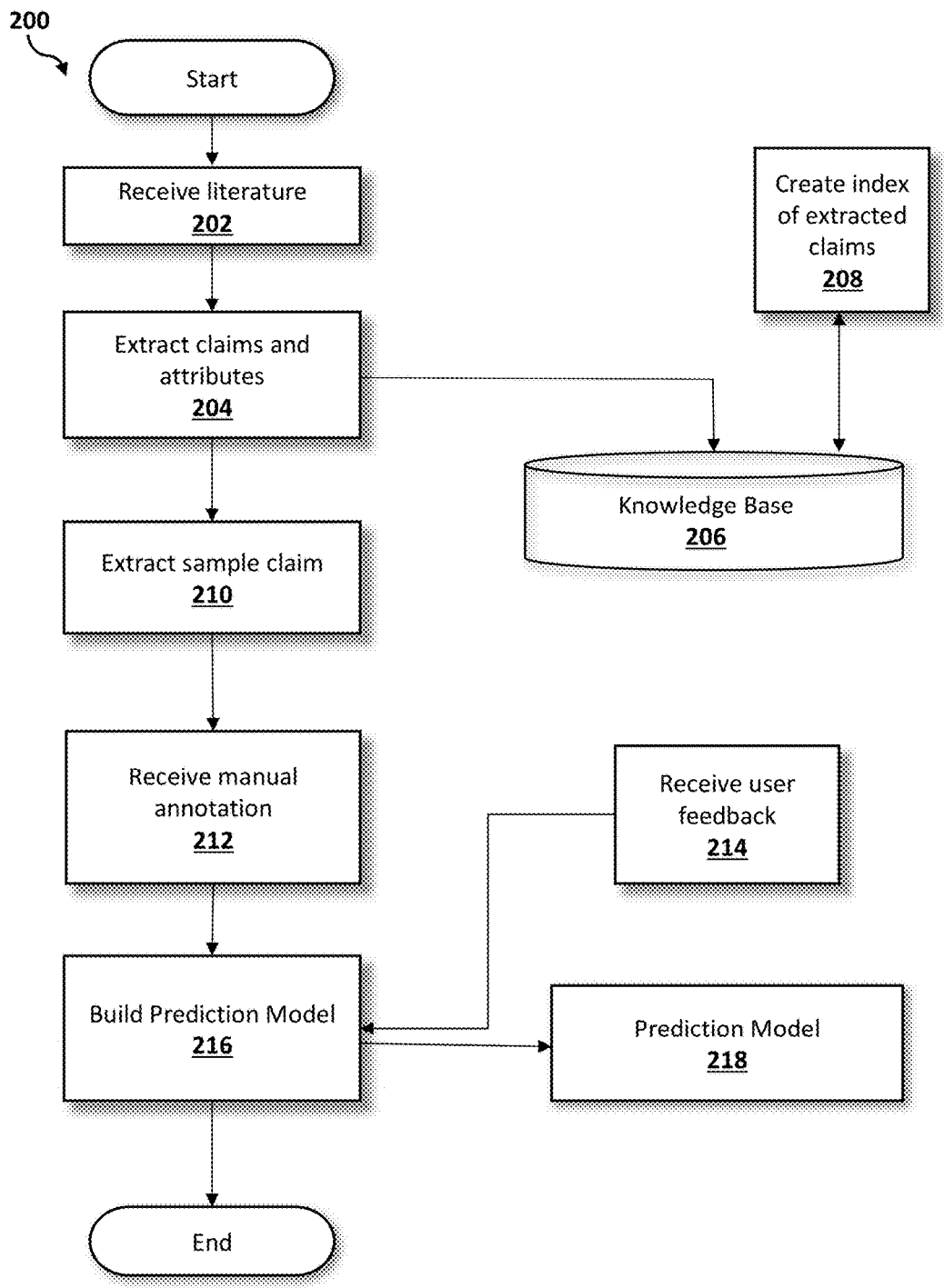
FIG. 2 is an operational flowchart illustrating a process for building the knowledge base and the prediction model to determine the history and reliability of each claim according to at least one embodiment.

Referring now to FIG. 2, an operational flowchart illustrating the exemplary knowledge base and prediction model building process 200 used by the claim reliability and history delivery program 110a and 110b according to at least one embodiment is depicted.

At 202, a collection of literature is received. Literature, such as social networks, mass media, magazines, newsfeed, and scientific publications, may be utilized to build a knowledge base and a prediction model. Literature may be entered into the claim reliability and history delivery program 110a, 110b to extract the claims and the attributes associated with the claims expressed in natural language. For example, newspaper articles, magazines, emails and scientific publications may be uploaded into the claim reliability and history delivery program 110a, 110b. Thereafter, these articles and publications are searched for claims, which may be extracted along with the attributes associated with the claim (i.e., type of literature, polarity of the claim, assertiveness of the claim, certainty of the claim, strength of evidence supporting the claim, and source of funding). Then, the extracted claims and associated attributes are used to determine the claim history and claim reliability.

Next, at 204, the claims and attributes associated with the claims are extracted from the literature, and the extracted claims and attributes are stored in the knowledge base 206. The claim reliability and history delivery program 110a, 110b may parse through each sentence of the literature to identify claims. Each of the identified claims are further analyzed to identify the attributes associated with each claim. The associated claim attributes may include type of literature, polarity of the claim, assertiveness of the claim, certainty expressed in the claim, strength of evidence supporting the claim and source of funding for the literature or associated study. Then, the extracted claims and the associated attributes may be stored in the knowledge base 206. Continuing the previous example, the claim reliability and history delivery program 110a, 110b parses through each sentence of the entered newspaper articles, magazines, scientific publications and emails. From the entered literature, the claim reliability and history delivery program 110a, 110b extracted hundreds of claims. For each claim, the claim reliability and history delivery program 110a, 110b analyzes the claim to obtain information related to the assertiveness of the claim, the type of literature that the claim was in, whether the claim includes a negative relationship between the entities involved in the claim, any indication of whether the claim was expressed with certainty or based on speculation, whether the claim was a part of a study and what was source of funding for study (i.e., independent or government-based), and whether the strength of the evidence is weak or strong. The extracted claims and the associated attributes of these claims are stored in the knowledge base 206 to create a claim history.

Then, at 208, the extracted claims and the associated attributes are indexed, and the indexed claims and attributes are stored in the knowledge base 206. The claim reliability and history delivery program 110a, 110b may index the extracted claims and the associated attributes for the claims to be easily accessible for retrieval by full claim, involved entities, and attributes for searching and navigating the history of a claim. The indexed claims and the associated attributes may be stored in the knowledge base 206. Therefore, the knowledge base and the prediction model building process 200 determines the history of the claim. Continuing the previous example, an index for all the extracted claims and associated attributes are created based on the entities involved in the claim, and the associated attributes of these claims. The index will create easy access to information included in the knowledge base 206, and easy retrieval of the full claim while searching for the claim history for a given claim. The index is stored in the knowledge base 206.

Then, at 210, a sample claim is retrieved from the claims and associated attributes extracted from the literature. The claim reliability and history delivery program 110a, 110b may utilize a subset of the total claims and associated attributes extracted from the literature. The sample claim and associated attributes (i.e., sample data) may be analyzed to build the prediction model. Continuing the previous example, from the extracted claims and associated attributes, the sample claim "listening to Mozart may improve cognitive reasoning skills," was retrieved from the knowledge base 206. This sample claim will be analyzed by the claim reliability and history delivery program 110a, 110b to build the prediction model. The claim was extracted from a scientific publication in which the findings that support the claim were based an independently funded case-control study conducted on over 500 people over the period of five years. These are factors (i.e., type of funding, study and literature), as well as any previous mentions of the given claim, contribute to the claim's reliability. However, the use of word "may" in the claim imposes a level of uncertainty in the claim and a decreased level of assertiveness, which will contribute to decrease in the claim's reliability. Additionally, any other opposing factors (e.g., negative polarity, uncertainty, less accurate type of study) in the previous mentions of the claim will also contribute to a decrease in the claim's reliability.

Then, at 212, manual annotation associated with each claim is received. During the building of the prediction model, human intervention may be required to manually review the supporting evidence for certain claims to determine the reliability of the claim. In particular, when a claim is mentioned in multiple literature sources, manual annotation may be utilized to review the claim mentions and compare the reliability of each claim as mentioned by the different sources. Such manual annotation may be useful in the initial stages of building the prediction model, until an accurate reliability is determined without manual annotation. Any changes performed by human intervention through the manual annotation may be utilized to build the prediction model. Continuing the previous example, a person reviews the sample claim on Mozart and cognitive reasoning skills, and the associated attributes to determine whether there is any evidence that was erroneously omitted, included or improperly misinterpreted. If the person determines that the associated attributes should be altered, then the person may manually change the claim or the associated attributes accordingly. Therefore, manual annotation may enable the prediction model to obtain an accurate reliability score for the sample claim based on the associated attributes and any previous mentions of the sample claim.

Then, at 214, user feedback is received to improve the reliability score computed by the prediction model 218. After manual annotation associated with the sample extraction is received at 212, the claim reliability and history delivery program 110a, 110b may include any user feedback on the claim and associated attributes included in the sample extraction. User feedback may be generated by a trusted user of the claim reliability and history delivery program 110a, 110b. A "User Feedback" button may be integrated in the claim reliability and history delivery program 110a, 110b. When the user clicks the button, a dialog box may appear. The dialog box may include the claim that is the subject of the user feedback, the reason for the feedback, and "Satisfied" or "Dissatisfied" buttons next to the subject claim. Therefore, the user may report any positive or negative feedback to the claim reliability and history delivery program 110a, 110b. At the bottom of the dialog box, there may be a "Submit" button in which the user may submit the feedback upon completion. The user feedback may be reported to the claim reliability and history delivery program 110a, 110b, and the user feedback may be used to formulate the prediction model 218 by improving the accuracy of the claim reliability score based on the reasons for the user feedback. The user feedback and any changes to the reliability of the claim may be utilized to build the prediction model 218.

Continuing the previous example, a user of the claim reliability and history delivery program 110a, 110b noticed that the study that derived the findings for the basis of the claim "listening to Mozart may improve cognitive reasoning skills" was erroneously labeled as independent. However, based on subsequent publications, the government was revealed as the source of the funding for the study. Therefore, the study was not based on independent funding. The user may provide feedback to the claim reliability and history delivery program 110a, 110b to express the user's dissatisfaction with the claim, and indicate the reasons for the dissatisfaction. The user feedback may improve the accuracy of the reliability score for the claims and associated attributes generated by the prediction model 218.

Then, at 216, the sample claim and associated attributes are received by the regression learner, which is used to build the prediction model 218. The manual annotation and user feedback, if applicable, may be used as input into the regression learner. The prediction model 218 is the output of the regression learner, which is a commonly known process. The prediction model 218 may predict the reliability score of the given claim based on the associated attributes of the given claim and previous mentions of the same claim, even when the language used may be different. The claim reliability and history delivery program 110a, 110b may be able to recognize similar mentions of the given claim, even when the language used may be different. Therefore, the knowledge base and the prediction model building process 200 determines the reliability score of the sample claim. Continuing the previous example, after changes to the sample claims and the associated attributes were made by the manual annotation and the user feedback (if applicable), the output of the regression learner is the prediction model 218, which will predict the reliability score of the claim, "listening to Mozart may improve cognitive reasoning skills." Some of the associated attributes of the claim—the positive polarity, type of literature and assertiveness of most instances—will contribute to an increase the reliability of the given claim. However, due to the attributes indicating that the instances with the strongest supporting evidence (i.e., large-scale randomized controlled trials) have a negative polarity, the final reliability will be low according to prediction model 218.

Figure 3:
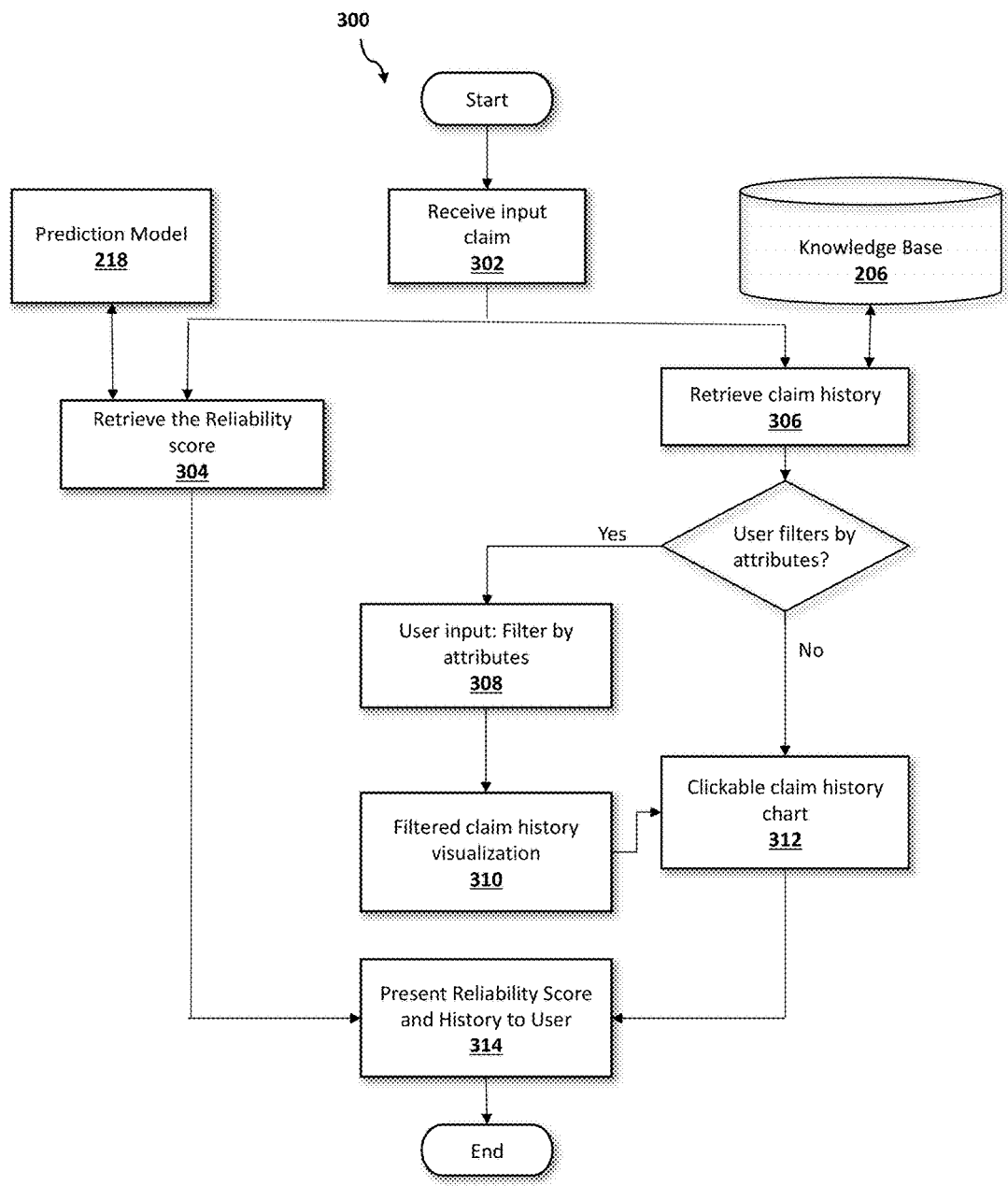
FIG. 3 is an operational flowchart illustrating a process for determining the reliability and history of a claim according to at least one embodiment.

Referring now to FIG. 3, an operational flowchart illustrating the exemplary process for determining the reliability and history of a claim 300 used by the claim reliability and history delivery program 110a, 110b according to at least one embodiment is depicted.

At 302, a claim (i.e., input data) is entered into the claim reliability and history delivery program 110a, 110b by a user. Using a software program 108 on the user's device (e.g., user's computer 102), the claim may be received as input into the claim reliability and history delivery program 110a, 110b. The claim may include two or more involved entities in which the claim reliability and history delivery program 110a, 110b may provide a claim reliability score and claim history for the given claim based on the associated attributes of the claim. The associated attributes may be based on previous mentions of the claim, which are stored on and retrievable from the knowledge base 206, and the reliability score of each claim may be generated, in real time, by the prediction model 218. After the claim is entered, the claim reliability and history delivery program 110a, 110b may prompt the user to review the claim reliability score and claim history of the given claim simultaneously or separately. A dialog box may appear with three options: to view the claim reliability and claim history simultaneously; to view the claim reliability and then the claim history; and, to view the claim history first and then the claim reliability score. A button may be included next to each option. The user may click on the button that corresponds with the option that best supports how the user chooses to view the information on the reliability and history of the given claim. Once the user selects an option, the dialog box may disappear.

For example, the user entered the claim, "people who inherit DNA mutations from their parents possess a greatly increased risk of developing certain cancers." Thereafter the user is prompted by the claim reliability and history delivery program 110a, 110b to indicate whether the user prefers: to view the claim reliability and claim history simultaneously; to view the claim reliability first, and then the claim history; or to view the claim history first, and then the claim reliability. The user may choose, for example, to view the claim reliability first, and then the claim history. The dialog box disappears after the claim reliability and history delivery program 110a, 110b determines that the user selected one of the three options. According to the embodiment presented in FIG. 3, the user selects to view the claim reliability and claim history simultaneously.

Next, at 304, if the claim reliability and history delivery program 110a, 110b determines that the user chose to view the reliability of the claim, then the claim reliability score will be retrieved when the claim reliability and history delivery program 110a, 110b runs the prediction model 218. The claim reliability and history delivery program 110a, 110b may use the entered claim as input into the prediction model 218, and run the prediction model 218 to compute the claim reliability score that corresponds with the entered claim. Previous mentions of the semantically equivalent claim and associated attributes extracted from literature sources may be utilized for the prediction model 218 to compute the claim reliability score. Therefore, the claim reliability score for the given claim, which may appear in multiple instances, may be retrieved as an output of the prediction model 218. Continuing the previous example, the user may choose to view the claim reliability first, and then, the claim history. Thereafter, the claim reliability and history delivery program 110a, 110b uses the entered claim, "people who inherit DNA mutations from their parents possess a greatly increased risk of developing certain cancers," as input into the prediction model 218, and runs the prediction model 218 to compute the reliability score for the claim. The reliability score for the claim is based on the other similar claims and their reliability scores. The claim reliability and history delivery program 110a, 110b obtains a reliability score of less than one based on the previous mentions of the entered claim, and the attributes (i.e., types of literature, types of studies, source of funding) associated with the entered claim. If the given claim is retrieved from a recent scientific publication based on an independent study, then the given claim may obtain a relatively high reliability score, such as 0.8.

However, when the claim reliability and history delivery program 110a, 110b determines that the user chose to view the claim history, then, at 306, the claim reliability and history delivery program 110a, 110b will retrieve the history of the entered claim from the knowledge base 206. The claim reliability and history delivery program 110a, 110b may search the knowledge base 206 for the history of the entered claim. The claim reliability and history delivery program 110a, 110b may determine the history of the entered claim based on data corresponding to the given claim stored in the knowledge base 206. Previous mentions of the semantically equivalent claim and associated attributes from literature sources may be utilized to determine the history of the entered claim. Therefore, a list of previous mentions of the entered claim may be retrieved as the output from the knowledge base 206.

Continuing the previous example, the claim reliability and history delivery program 110a, 110b will search the knowledge base 206 for all previous mentions of the entered claim, and retrieve a list of the previous mentions. The previous mentions will include any mention of the entered claim, even a previous mention supporting a negative relationship between "inherited DNA mutations" and "a greatly increased risk of developing certain cancers," such as "inherited DNA mutations are not linked to a person's risk of developing certain cancers." Next to each previous mention of the given claim will be a list of associated attributes for each claim, such as the history of the entered claim "people who inherit DNA mutations from their parents possess a greatly increased risk of developing certain cancers," includes 18 previous mentions. Each previous mention is presented to the user as a list with each of the associated attributes (i.e., type of literature, source of funding, type of study) next to each of the previous mentions.

Then, at 308, the user filters the claim attributes to navigate the history of the given claim. After the claim reliability and history delivery program 110a, 110b presents the history of the given claim to the user, the claim reliability and history delivery program 110a, 110b may prompt the user to filter the claim history by the associated attributes. A dialog box may appear in which the claim reliability and history delivery program 110a, 110b may prompt the user to filter by the associated attributes. In the dialog box, there may be "Yes" and "No" buttons. If the user clicks the "Yes" button to filter the attributes, then the claim reliability and history delivery program 110a, 110b may prompt the user to select the associated attributes to filter the history of the given claim. A drop box with a list of associated attributes may be presented in a dialog box in which each associated attribute may be placed next to a button. To select an associated attribute, the user may select the button corresponding with the associated attribute. After the button(s) for the associated attributes are selected, the user may select the "Submit" button at the end of the list of associated attributes. Then, the dialog box may disappear, and the user may be provided a visualization of the filtered claim history of the entered claim based on the selected attributes. If the user clicks the "No" button, however, to filter the attributes, then the claim reliability and history delivery program 110a, 110b may allow the user to continue to view the unfiltered history of the given claim, and view the claim history through the use of a clickable claim history chart.

Continuing the previous example, after the list of previous mentions of the given claim was generated by the claim reliability and history delivery program 110a, 110b, the user will be prompted on whether the user prefers to filter the claim history by the attributes. If the user selects "Yes," then a drop box with a list of associated attributes will appear in the dialog box. The user may select type of literature, source of funding and strength of the evidence supporting the claim, and then the user will click the "Submit" button.

Then, at 310, a visualization of the filtered claim history (i.e., searchable visual representations of the history of the analyzed claim) is presented. After the user selects the associated attributes to filter the history of the given claim, the claim reliability and history delivery program 110a, 110b may provide the user with the different visualizations to navigate all instances of the previous mentions of semantically equivalent claims in the literature for the user to quickly assess the evidence of each instance according to the different visualizations based on the associated attributes. Each of the filtered claim history visualization charts may include a different associated attribute selected by the user, and provide the history of the claim based on the individual associated attribute selected by the user. Each visualization chart may include a list of the previous mentions of the semantically equivalent claims and the description on whether the previously mentioned claim obtains a high or low rating for the associated attribute selected by the user. The user may select the "Next" or "Previous" buttons at the bottom of the visualization chart to move to the next visualization chart for another associated attribute selected by the user. If the user has viewed all the generated visualization charts, then the "Next" button may not appear at the bottom of the last visualization chart. Alternatively, if the user is at the first visualization chart, then the "Previous" button may not appear at the bottom of the first visualization chart.

Continuing the previous example, after the user submitted the type of literature, source of funding and strength of the evidence supporting the claim to filter the attributes associated with the claim, at least three filtered visualizations of the history of the entered claim were generated by the claim reliability and history delivery program 110a, 110b. Each associated attribute selected by the user generates a different visualization chart. Each visualization chart includes all 18 of the previous mentions of the entered claim, and provides a rating of high or low for the associated attribute included in each visualization chart. The user clicks the "Previous" or "Next" buttons located at the bottom of each visualization chart to navigate between each of the individual visualization charts.

Then, at 312, a clickable claim history chart (i.e., searchable visual representations of the history of the analyzed claim) is received. Regardless of whether the user declines or agrees to filter the claim history by associated attributes, the claim reliability and history delivery program 110a, 110b may provide a clickable claim history chart for the user to view the history of the given claim. A "Clickable Claim History Chart" button may be integrated into the claim reliability and history delivery program 110a, 110b. If the user selects the button, then the previous mentions of the entered claim may be hyperlinked, and the user may click on a claim mentioned in the claim history. Then, the user may be directed to the literature that is supporting the claim and the associated attributes for the selected claim. Therefore, the user may be able to navigate through the literature, or find the citation in which the claim is mentioned, for the related selected claim.

Then, at 314, the claim reliability and history delivery program 110a, 110b presents the claim reliability score and claim history of the entered claim and the associated attributes to the user. Regardless of whether the user may choose to view the claim reliability and history simultaneously, the claim reliability first or the claim history first, the user may obtain both a reliability score and history of the entered claim at the completion of the claim reliability and history delivery program 110a, 110b. The user may utilize the reliability score and history of the entered claim to further investigate the claim, as well as to interpret and utilize the entered claim accordingly. Continuing the previous example, the entered claim, "people who inherit DNA mutations from their parents possess a greatly increased risk of developing certain cancers," was run through the prediction model 218 and obtained a relatively high reliability score, such as 0.8, and 18 previous mentions of the entered claim were retrieved from the knowledge base 206. Both the reliability score and the 18 previous mentions of the entered claim are presented to the user.

Continuing the previous example, if the user clicks on the "Clickable Claim History Chart" button, then the previous mentions of the entered claim are hyperlinked, and the user could click on the hyperlinked previous mentions of the claim to review the literature that include the previous mentions. The user clicks on the hyperlink for the previous mention of the entered claim, which stated "people who inherit DNA mutations from their parents do not possess a greatly increased risk of developing certain cancers." The hyperlink directs the user to a scientific publication published approximately eight years ago. The user reviews the entire publication and investigates the findings generated by the study conducted on people who inherited DNA mutations.

According to another embodiment, the claim reliability and history delivery program 110a, 110b may collect user feedback after presenting claim history and reliability score to user. Continuing the previous example, the user determines that the several of the previous mentions of the given claim "people who inherit DNA mutations from their parents possess a greatly increased risk of developing certain cancers," were unreliable and out-of-date. Recent studies that include the given claim disprove the previous mentions of the given claim, and therefore, the previous mentions of the given claim should have a lower reliability score. The user may opt to provide this feedback to the claim reliability and history delivery program 110a, 110b. A "User Feedback" button may be integrated in the claim reliability and history delivery program 110a, 110b. When the user clicks the button, a dialog box may appear. The dialog box may include the claim that is the subject of the user feedback, the reason for the feedback, and "Satisfied" or "Dissatisfied" buttons next to the subject claim. Therefore, the user may report any positive or negative feedback to the claim reliability and history delivery program 110a, 110b. At the bottom of the dialog box, there may be a "Submit" button in which the user may submit the feedback upon completion.

Figure 4:
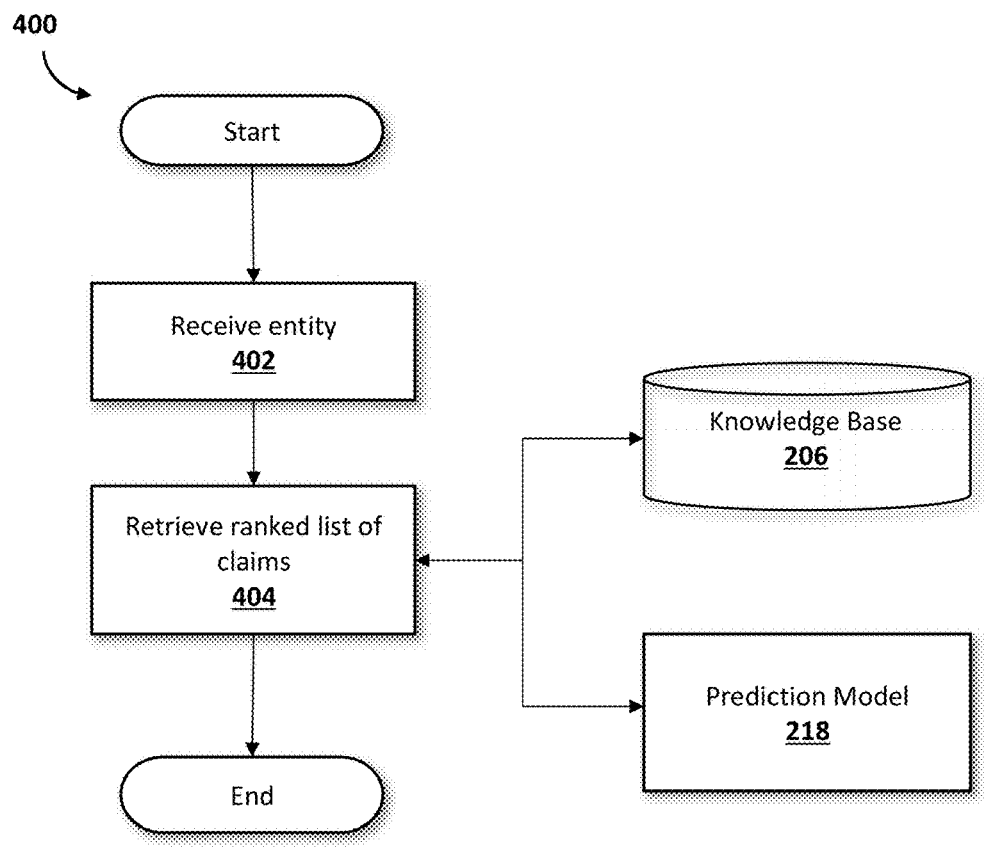
FIG. 4 is an operational flowchart illustrating a process for determining the reliability and history of claims that include an entity according to at least one embodiment.

Referring now to FIG. 4, an operational flowchart illustrating the exemplary process for determining the reliability and history of claims for an entity 400 used by the claim reliability and history delivery program 110a, 110b according to at least one embodiment is depicted.

At 402, an entity (i.e., input data) is received from the user and entered into the claim reliability and history delivery program 110a, 110b. Using a software program 108 on the user's device (e.g., user's computer 102), the entity may be received as input into the claim reliability and history delivery program 110a, 110b. Each claim may include two or more objects or involved entities (i.e., people, organizations, locations, events, dates, items, diseases, genes, proteins). The claim reliability and history delivery program 110a, 110b may provide a claim reliability score and claim history for the given claim based on the associated attributes of the claim. By entering an entity for each claim, then the claim reliability and history delivery program 110a, 110b may retrieve from the knowledge base 206 all the claims that may include this entity. For example, the user enters the entity "listening to classical music" into the claim reliability and history delivery program 110a, 110b.

Then, at 404, the ranked list of claims is retrieved from the prediction model 218. The entity from the user may be entered into the claim reliability and history delivery program 110a, 110b. The claim reliability and history delivery program 110a, 110b may search the knowledge base 206 for claims that include the entered entity, and then, the claim reliability and history delivery program 110a, 110b may enter the claims retrieved from the knowledge base 206 as input into the prediction model 218. The output of the prediction model 218 may include the reliability score for each of the corresponding claims in real time. The claim reliability and history delivery program 110a, 110b may provide the user with a list of corresponding claims ranked by the reliability score of each of claim (i.e., customized list with reliability score and history for the plurality of claims). The user may click on the individual claim and may obtain the history of the claim. Therefore, the user may be able to review the history of the claim, as well as the claim reliability score. Continuing the previous example, the claim reliability and history delivery program searches the knowledge base 206 for all claims which include the entered entity, which is approximately 16 different claims. The claims may include "listening to classical music does not improve cognitive reasoning skills," "the parietal lobe located in the cerebrum of the brain is activated when listening to classical music," and "motorists drive below the speed limit when they are listening to classical music." All 16 claims retrieved from the knowledge base 206 may be entered into the prediction model 218. The prediction model 218 outputs the score for each of the 16 corresponding claims. Then, the claim reliability and history delivery program 110a, 110b ranks the 16 claims from highest to lowest reliability score based on the associated attributes for each of the 16 claims. Therefore, the claim reliability and history delivery program 110a, 110b provides a ranked list of the claims associated with the entered entity, "listening to classical music."

In another embodiment, the process for determining the reliability and history of claims for an entity 400 used by the claim reliability and history delivery program 110a, 110b may include an option for the user to customize the ranking of the claims. A button to customize the ranking of the claims may be integrated into the claim reliability and history delivery program 110a, 110b. To customize the ranking of the claims, the user may click the "Customize Listing" button to customize the ranking. Thereafter, a dialog box may appear in which the various customization options may be listed such as ranking (from highest to lowest reliability score), ranking (from lowest to highest reliability score), amount of studies (from most to least studies), and amount of studies (from least to most studies). A button may be next to each option for the user to click when selecting an option. Once the user selects the customization option and clicks the "Submit" button located below the customization options at the bottom of the dialog box, then the dialog box may disappear. The ranked list of claims may be automatically reorganized based on the new customization option selected by the user. Therefore, the user may be able to customize the ranking of the claims based on the amount of studies that mention the claim corresponding with the entered entity. Continuing the previous example, the claim reliability and history delivery program 110a, 110b generates a ranked list of previously mentioned claims for the entered entity "listening to classical music." The user selects the customization option, and when the dialog box appears, the user selects ranking (from lowest to highest reliability score). After the user clicks on the "Submit" button located at the bottom of the dialog box, the dialog box disappears and the list of previous mention claims are reorganized from ranking (highest to lowest) to ranking (lowest to highest).

It may be appreciated that FIGS. 2-4 provide only an illustration of one embodiment and do not imply any limitations with regard to how different embodiments may be implemented. Many modifications to the depicted embodiment(s) may be made based on design and implementation requirements.

Figure 5:
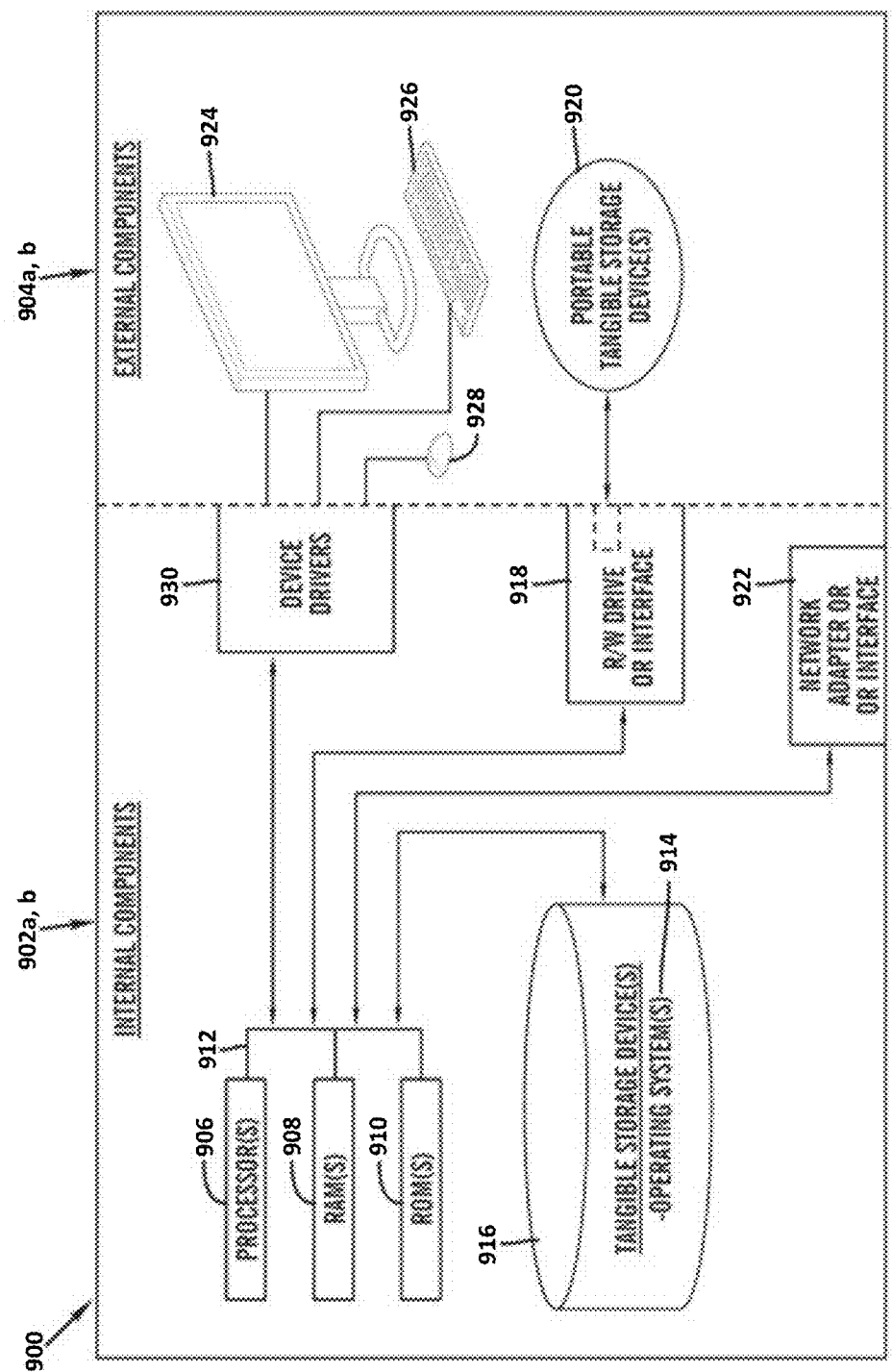
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 5. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the claim reliability and history delivery program 110a in client computer 102, and the claim reliability and history delivery program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the claim reliability and history delivery program 110*a* and 110*b* can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the claim reliability and history delivery program 110*a* in client computer 102 and the claim reliability and history delivery program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the claim reliability and history delivery program 110*a* in client computer 102 and the claim reliability and history delivery program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
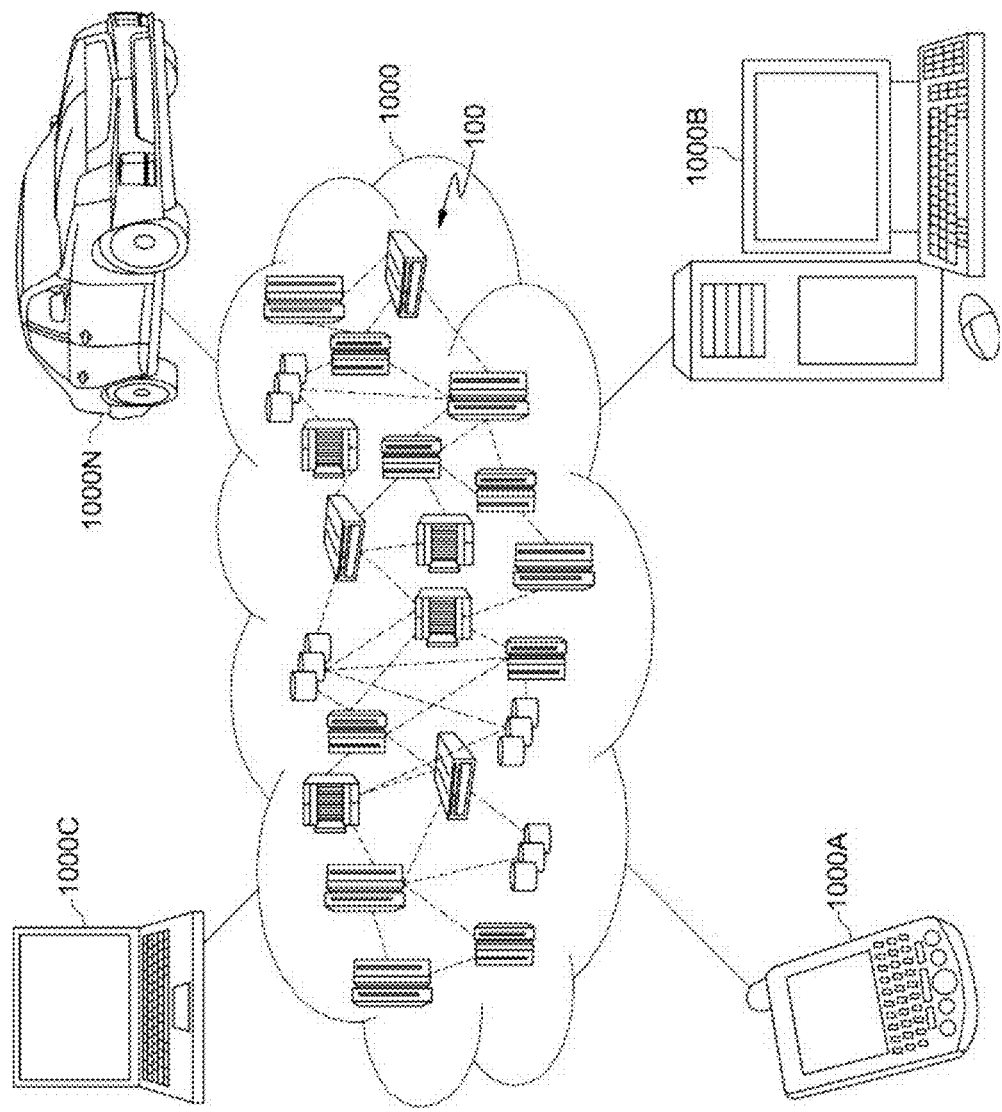
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and claim reliability and history delivery 1156. A claim reliability and history delivery program 110a, 110b provides a way to determine the reliability and history of a given claim.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining the reliability of a claim, the method comprising:

receiving a plurality of literature;

analyzing the plurality of literature to extract a plurality of claims and a plurality of attributes associated with the extracted plurality of claims;

storing, in a knowledge base, the extracted plurality of claims and plurality of attributes associated with the extracted plurality of claims;

generating an index for the extracted plurality of claims and plurality of attributes associated with the extracted plurality of claims;

storing, in the knowledge base, the generated index for the extracted plurality of claims and plurality of attributes associated with the extracted plurality of claims;

collecting a plurality of sample data from the extracted plurality of claims and plurality of attributes associated with the extracted plurality of claims;

receiving a plurality of manual annotations for the collected plurality of sample data;

collecting a plurality of user feedback associated with the sample data;

transmitting the received plurality of manual annotations and the collected plurality of user feedback associated with the sample data to a regression learner;

generating a prediction model as an output of the regression learner based on the transmitted plurality of manual annotations and plurality of user feedback;

generating, from the generated prediction model, a reliability score for the sample data based on the plurality of manual annotations and plurality of user feedback on the sample data received by the regression learner for an input data from a user;

receiving the input data from the user;

analyzing the claim associated with the received input data to determine a reliability score associated with the input data, wherein the claim is semantically similar to the received input data;

analyzing the claim associated with the received input data to determine a plurality of claims associated with the history of the claim associated with the received input data;

retrieving, from the knowledge base, a plurality of claims associated with the history of the analyzed claim associated with the received input data, wherein determining that the input data is an entity, wherein generating a customized list with the history for a plurality of claims associated with the received entity, wherein incorporating the reliability score for the plurality of claims associated with the received entity into the customized list with the history for the plurality of claims associated with the received entity, wherein presenting the customized list with the reliability score and history for the plurality of claims associated with the received entity to the user;

wherein determining that the input data is the claim, wherein generating a plurality of searchable visual representations of the history of the analyzed claim, wherein selecting a plurality of attributes associated with the analyzed claim to filter the history of the analyzed claim, wherein filtering the history of the analyzed claim based on the selected plurality of attributes associated with the analyzed claim, wherein generating a plurality of visualizations based on the filtered history, wherein presenting the generated plurality of visualizations to the user; and wherein receiving a request to view the history of the received claim with a clickable claim history chart, wherein generating the clickable claim history chart for the analyzed claim, wherein presenting the clickable claim history chart for the analyzed claim to the user;

generating, from a prediction model, the reliability score for the claim associated with the received input data; and presenting the reliability score from the claim associated with the received input data to the user.

* * * * *